(12) United States Patent
Samadani et al.

(10) Patent No.: US 8,537,246 B2
(45) Date of Patent: Sep. 17, 2013

(54) VIEW ANGLE FEEDBACK DEVICE AND METHOD

(75) Inventors: Ramin Samadani, Palo Alto, CA (US);
Mary G Baker, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 125 days.

(21) Appl. No.: 13/018,356

(22) Filed: Jan. 31, 2011

(65) Prior Publication Data

US 2012/0194693 A1 Aug. 2, 2012

(51) Int. Cl.
*H04N 5/262* (2006.01)
*H04N 5/222* (2006.01)

(52) U.S. Cl.
USPC ................................ 348/239; 348/333.01

(58) Field of Classification Search
None
See application file for complete search history.

(56) References Cited

U.S. PATENT DOCUMENTS

| | | | |
|---|---|---|---|
| 7,593,627 B2 | 9/2009 | Wernersson | |
| 2008/0300001 A1 | 12/2008 | Siddiqui et al. | |
| 2009/0167737 A1 | 7/2009 | Chen et al. | |
| 2009/0297062 A1 | 12/2009 | Molne et al. | |
| 2010/0149310 A1* | 6/2010 | Zhang et al. | 348/14.16 |
| 2010/0177197 A1* | 7/2010 | Kimura et al. | 348/208.2 |
| 2010/0177198 A1* | 7/2010 | Hayashi et al. | 348/208.2 |

OTHER PUBLICATIONS

Nasiri et al~"Motion Processing: The Next Breakthrough Function in Handsets"~InvenSense~Jul. 2010~10 pages.
Schwarten et al~"A Comparison of Motion and Keypad Interaction for Fine Manipulation on Mobile Devices"~Published by the British Compuet Society 2008~4 pags.

* cited by examiner

*Primary Examiner* — Tuan Ho
*Assistant Examiner* — Chan Nguyen

(57) ABSTRACT

The present invention provides a portable device that includes at least one view angle sensor for collecting sensor information about the view angle of the portable device. It also includes a view angle determination component for determining (1) the view angle of the portable device engaged in a videoconference session and (2) whether the view angle is within a predefined range for the videoconference session. The portable device also includes a feedback component, wherein responsive to the determination that the view angle is out of range, providing user feedback.

13 Claims, 5 Drawing Sheets

VIEW ANGLE FEEDBACK DEVICE AND METHOD

CROSS-REFERENCE TO RELATED APPLICATION

This case is related to the case entitled "Audiovisual Feedback to Users of Video Conferencing Applications" filed on Oct. 27, 2009, having Ser. No. 12/606,318, which is hereby incorporated by reference in its entirety.

BACKGROUND

Portable electronic devices such as cell phones or tablet computers are increasingly being used for video conferencing applications. Unlike desktop video conferencing, when portable electronic devices are used the users hold the electronic device in their hands. Because the video camera capture view angle of these portable devices is not constrained or fixed, a poor view angle often results. For example, a user may hold the phone at too low an angle, resulting in an unappealing upwards view of the user's nostrils or chin being broadcast.

BRIEF DESCRIPTION OF DRAWINGS

The figures depict implementations/embodiments of the invention and not the invention itself. Some embodiments are described, by way of example, with respect to the following Figures.

The drawings referred to in this Brief Description should not be understood as being drawn to scale unless specifically noted.

DETAILED DESCRIPTION OF EMBODIMENTS

For simplicity and illustrative purposes, the principles of the embodiments are described by referring mainly to examples thereof. In the following description, numerous specific details are set forth in order to provide a thorough understanding of the embodiments. It will be apparent, however, to one of ordinary skill in the art, that the embodiments may be practiced without limitation to these specific details. Also, different embodiments may be used together. In some instances, well known methods and structures have not been described in detail so as not to unnecessarily obscure the description of the embodiments.

Portable devices such as cell phones or tablet computers may result in poor view angle capture and an unappealing view of a user participating in a video conference. Commonly, the user may hold the device too low, resulting in an unappealing upwards view. This invention improves the quality of the video by using view angle sensing together with user feedback to subtly enforce capture from a better view angle. Because portable devices often have limited processing capacity, the methods for providing an improved view and feedback use less computationally intense methods than image processing tasks (such as face detection) that may be used in other systems to ensure proper framing of the user.

In one embodiment, instead of using more computationally complex face detection methods to ensure a desirable view angle and proper framing of the user, data from an accelerometer embedded in the portable device is used. The accelerometer provides data that can be used to determine the view angle of the portable device. If the view angle is not within an acceptable range, then feedback is provided to the user which provides an indication that the view angle should be modified or corrected.

Figure 1:
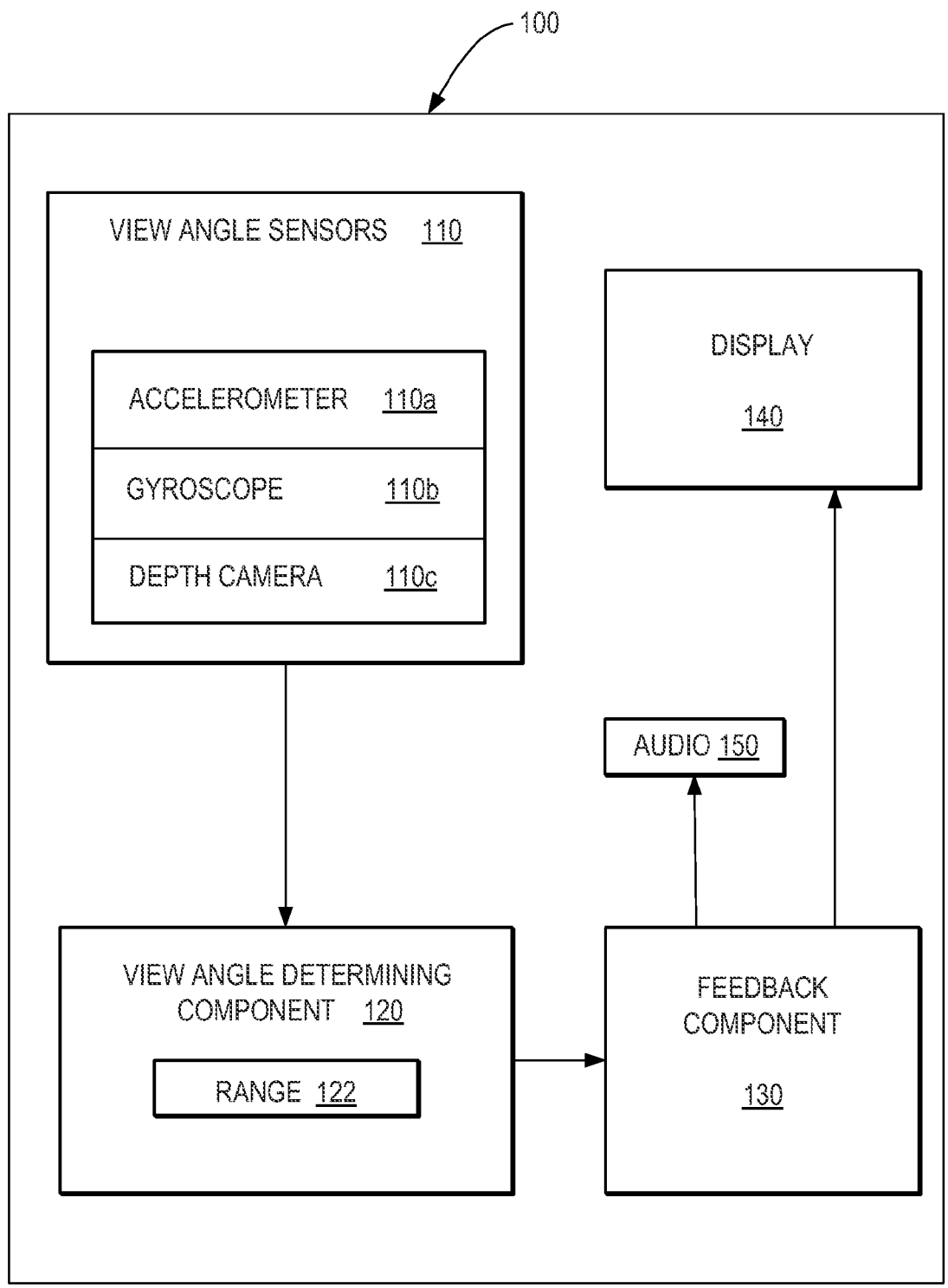
FIG. 1 illustrates a block diagram of a portable device that includes view angle sensors according to an embodiment of the invention.

FIG. 1 illustrates a block diagram of a portable device that can be used to determine the view angle and also to determine if the view angle is within an acceptable predefined range. The portable device 100 includes: at least one view angle sensor 110 for collecting sensor information about the view angle of the portable device; a view angle determination component 120 for determining the view angle of the portable device engaged in a videoconference session and for whether the view angle is within an acceptable range for the videoconference session; and a feedback correction component 130 wherein responsive to the determination that the viewing angle is out of range, providing user feedback.

The portable device 100 described performs a method (shown in FIG. 3) of providing feedback based on a computed view angle. The method 300 includes the steps of: capturing sensor data from at least one view angle sensor, the at least one view angle sensor for determining the view angle of a portable device engaged in a video conferencing session (step 310); and determining the view angle of the portable device (step 320); determining whether the view angle is within a predefined range (step 330), wherein responsive to the determination of whether the view angle is not within a predefined range, providing feedback (step 340).

A first step in the described method is capturing sensor data from at least one view angle sensor. The view angle sensor data is used to calculate the view angle of the portable device. Referring to FIG. 1, the portable device may use alternative sensor types for determining the view angle. In the example shown in FIG. 1, the types of sensor data used for determining the view angle can include, but is not limited by, data from an accelerometer 110a, a gyroscope 110b or a depth camera 110c.

In one example, the type of sensor data used to determine the view angle of the portable device is gathered from an accelerometer 110. It is becoming increasingly common for portable devices to include an accelerometer. These accelerometers are often used to sense orientation of the display screen (portrait or landscape), but in our application we use the accelerometer sensing device 110a for a different purpose. In one example, the sensing devices are three axis accelerometers. The accelerometers sense gravity direction, know if the accelerometer is not aligned with the gravity vector in 3D space and at what angle the accelerometer is with respect to the gravity vector. The accelerometer then output the components of "gravity acceleration" data in the local coordinates of the accelerometer. The gravity acceleration data output from the accelerometer can be used to calculate the viewing angle of the portable device in which the accelerometer is embedded in or coupled to.

In one example, the at least one view angle sensor includes both an accelerometer 110a and gyroscope 110b in combination. The use of the gyroscope data in combination with accelerometer data can provide additional accuracy in determining the view angle. Although the accelerometer provides local coordinates of the portable device, this data can be noisy, especially when the mobile device has significant shaking or movement while being held by a user.

Figure 2A:
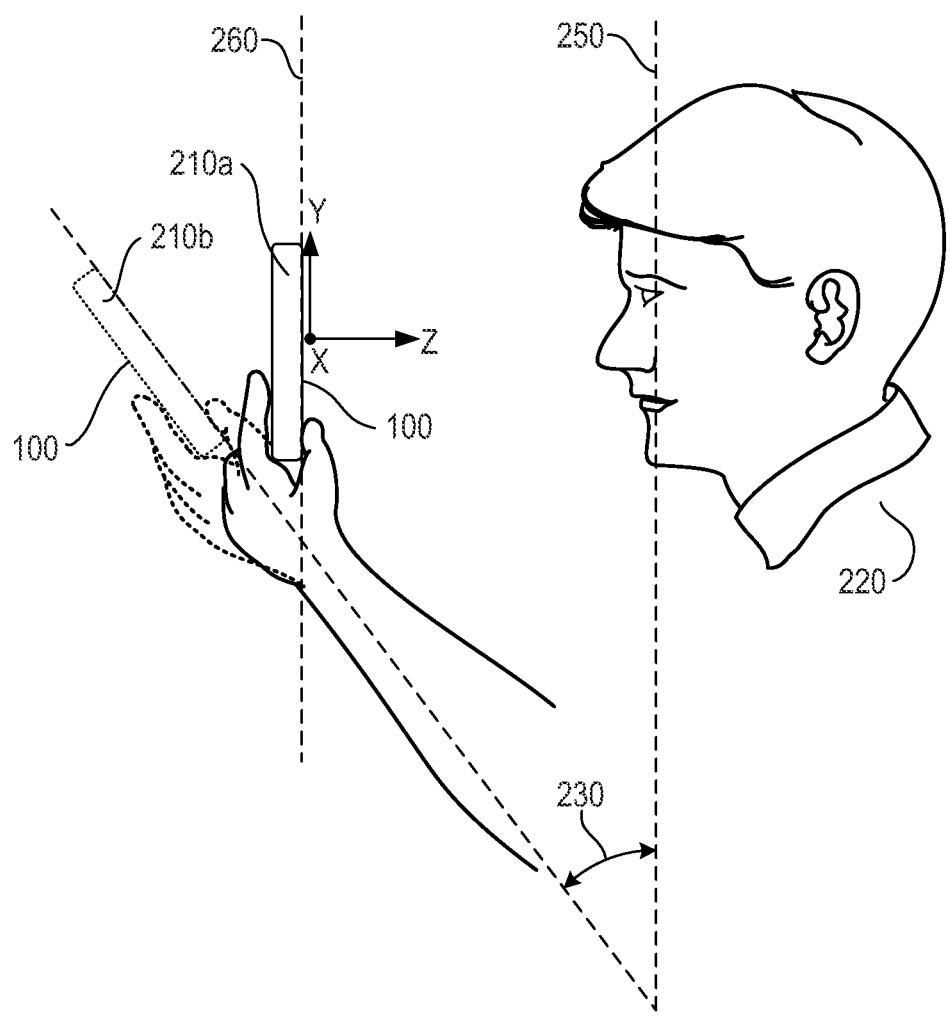
FIG. 2A illustrates a side view of a user interacting with a portable electronic device positioned in different view angles according to an embodiment of the invention.

FIG. 2A illustrates a side view of a user 220 interacting with a portable electronic device positioned in two different view angles (position 210a and position 210b) according to an embodiment of the invention. The view angle is discussed with respect to an electronic device having an accelerometer embedded in the device. Ideally, the device 100 is being held vertically in front of the local user's face, as shown with the position of the device shown as 210a as if he is talking face-to-face with the remote participant. The dotted line 250 is representative of a plane through the user's face. The dotted line 250 is representative of a plane through the portable electronic device 100, preferably extending through the display screen surface of the electronic device.

The view angle of the portable device is the angle between the plane of the face 250 and the plane of the device's display screen 260. Referring to FIG. 2A, the view angle of the electronic device in view position 210a is zero degrees. While the view angle of the electronic device in view position 210b is the angle defined by the angle 230. Referring to FIG. 2A shows an xyz coordinate system where x and y are in the plane of the electronic device 100 with x pointing into the paper and z is the coordinate normal to the screen surface of the device pointing towards the viewer. The magnitude of the z component may be used to detect the view angle. In addition, the x and y components may be useful to ensure the display is not rotated.

For comfort, though, some small angle from the vertical 260 may be tolerated. For example, in one embodiment 15 degrees from the vertical (vertical with respect to the Earth's gravity) may be tolerated. In one example, the tolerated angle (within a predefined range) from the vertical may vary dependent upon the height that the electronic device is held. For example in FIG. 2A, the tolerated angle from the vertical might be 15 degrees, while in FIG. 2B where the electronic device 210c is held in a lower position which is more likely to provide an unappealing view, the tolerated angle from the vertical might be 5 degrees.

In one embodiment, instead of using data from an accelerometer to determine the view angle of the portable device, a depth camera 110c is used as the view angle sensing device. Again since image processing is only optionally used to confirm the placement of the user, the system 100 makes the assumption that in a video conferencing session, that the user is positioned or standing in front of the display screen of the portable device.

In one example, the depth camera includes an infrared sensing component. The depth sensors in the camera 110c bounce light off of points on the user's face to determine the distance and angle from the user. Once the distance from the depth camera is known, the position and orientation of the user with respect to the depth camera is known and the coordinates of the portable electronic device can be calculated. Using the coordinates of the portable electronic device, the viewing angle of the portable device in which the depth camera is embedded in or coupled to can be determined.

Figure 3:
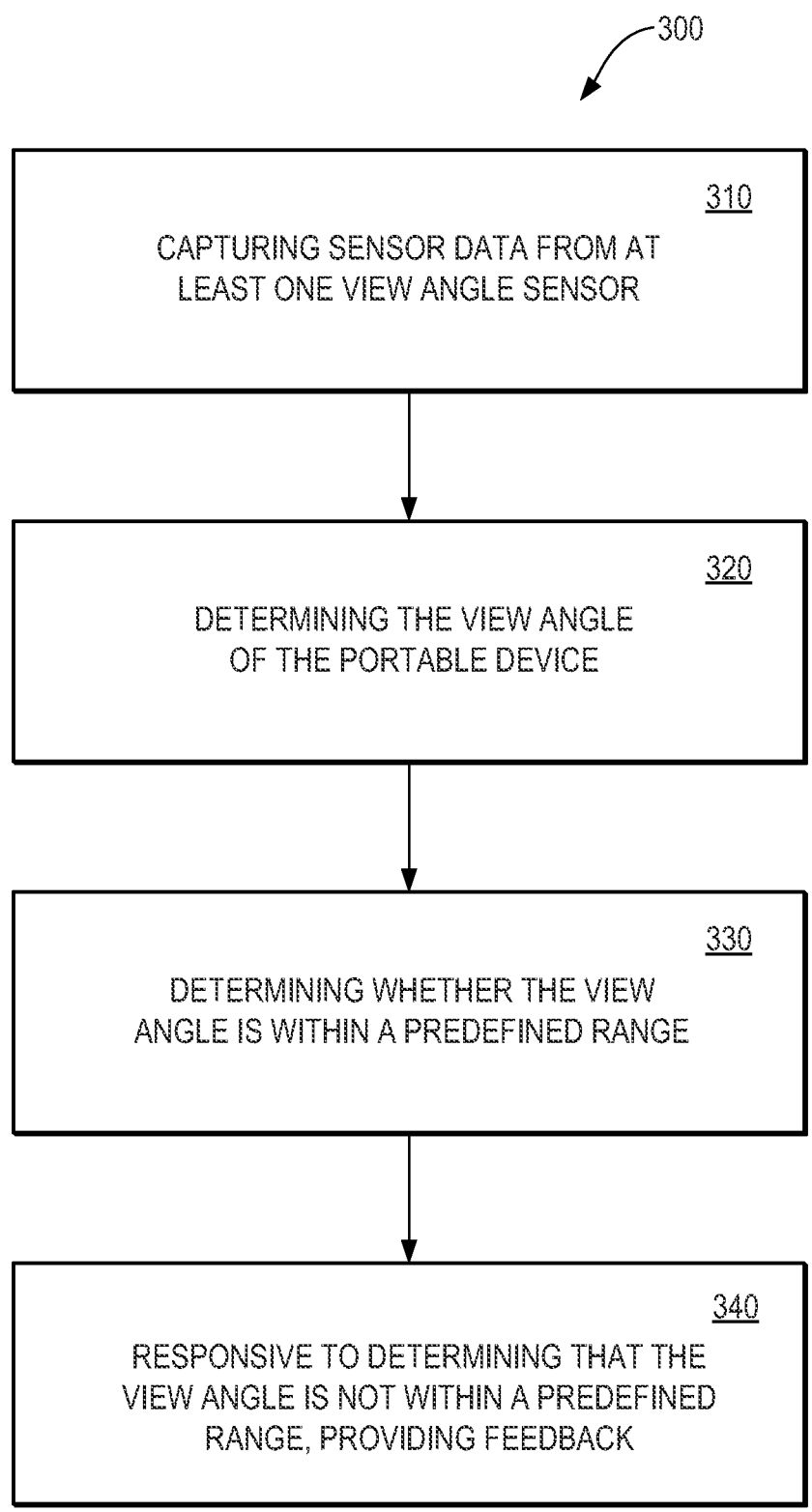
FIG. 3 shows a flow diagram for a method of display according to an embodiment of the invention.

Referring to FIG. 3, the step of determining the view angle of the portable device from the view angle sensor data is followed by the steps of: determining whether the view angle is within a predefined range (step 330), wherein responsive to the determination of whether the view angle is not within a predefined range, providing user feedback (step 340). In one example, the predefined range is the range of view angles that gives a visually satisfactory (no unappealing nose or chin view) angle of the local user or local participant participating in the video conference. The feedback given to the user may be of the type that naturally causes the local participant to change how they are holding the device.

If the view angle is not within a predefined acceptable range 122, then feedback is given to user to correct the view angle. Typically, the participant in the video conference is viewing video of the remote participant. In one embodiment, the feedback is a change in viewing the remote participant to the captured video of the local user holding the device at an incorrect viewing angle. In another example, the captured video local user holding the device at an incorrect viewing angle is blended with the video of the remote participant. It is anticipated that the local user, seeing the unappealing image, will modify the position that he is holding the electronic device.

In another example, if the view angle is not within a predefined acceptable range, then the feedback given is by means of the video of the remote participant, which is modified. One method is to have the video of the remote conferencing participant appear normally when the device is held within range of the predefined acceptable view angle range. However, if the electronic device 100 is tilted and held too low, causing the z component to be too large with respect to the other components and out of the acceptable predefined view angle range, the system modifies the incoming remote video. In one example, the remote video is modified by lowering its contrast. In one example, the remote video contrast is lowered in a manner proportional to the wrong view angle. The modification or change of the video, in turn naturally causes the local participant to lift the electronic device and tilt it so that the video contrast improves so that it is easier to view the remote participants.

Figure 2B:
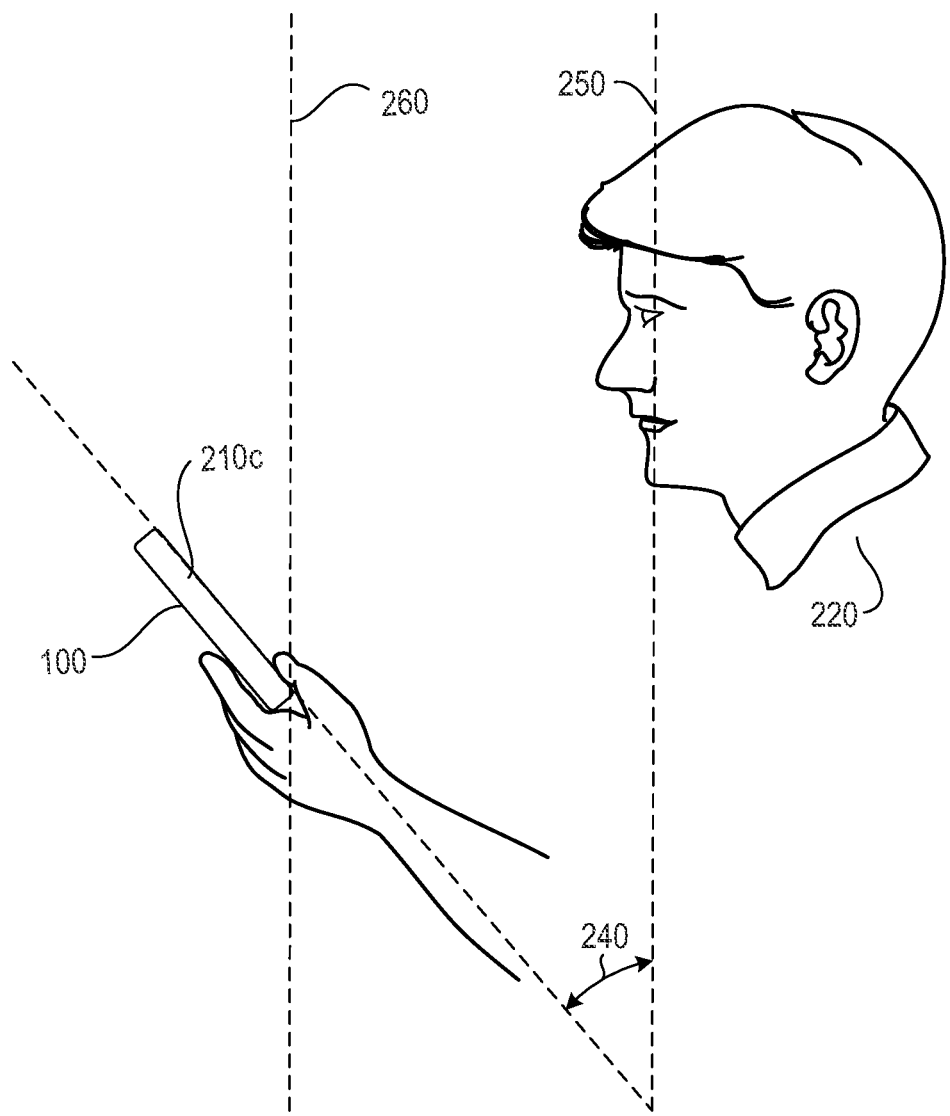
FIG. 2B illustrates a side view of a user interacting with a portable electronic device positioned at a lower height than the electronic device shown in FIG. 2A according to an embodiment of the invention.

Another way to provide feedback, is to skew the shape of the window displaying the video. For example, in one embodiment when the electronic device is off alignment so that is it is tilted away from the vertical such as shown in FIGS. 2A and 2B. In one example, the more the electronic device 100 is tilted away from the vertical, the more trapezoidal (and less rectangular) the video viewing window displayed becomes. If, for instance, the top of the device is tilted too far away from the user relative to the bottom of the device, then the video window is skewed so that the top vertical is smaller than the bottom vertical. To make it rectangular again, the user must tilt the top of the electronic device back towards himself.

There are many alternative ways to provide feedback such as providing text-based feedback to the display 140 or alternatively providing an audio cue 150 to the electronic device. In an another example, the video captured could be modified by modifying the position of the remote participant on the display 140.

FIG. 3 shows a flow diagram for a method of providing view angle feedback to a user during a video conferencing session according to an embodiment of the invention. Referring to FIG. 3 shows the steps of: capturing sensor data from at least one view angle sensor, the at least one view angle sensor for determining the view angle of a portable device engaged in a video conferencing session (step 310); and determining the view angle of the portable device (step 320); determining whether the view angle is within a predefined range (step 330), wherein responsive to the determination of whether the view angle is not within a predefined range, providing user feedback (step 340).

Figure 4:
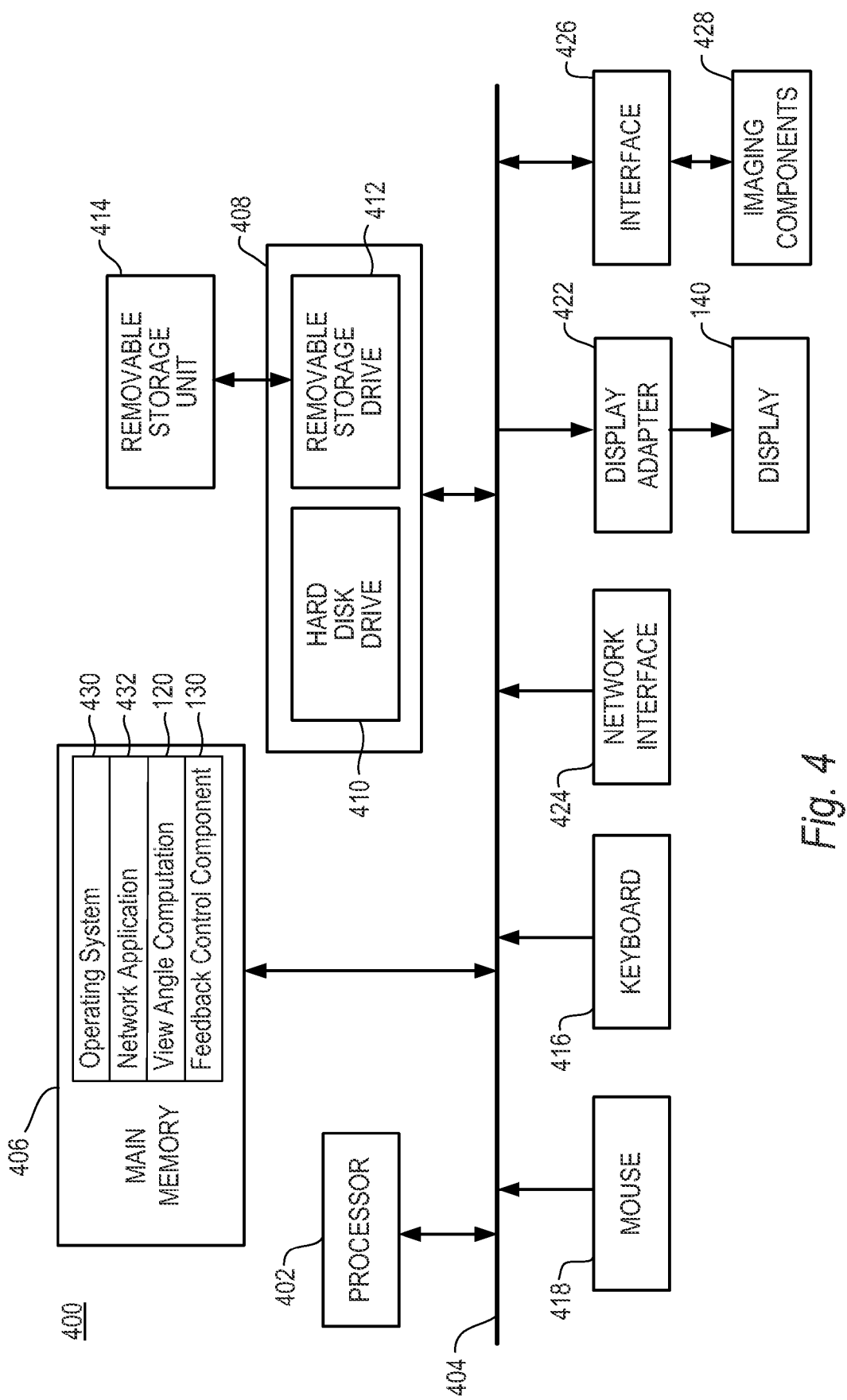
FIG. 4 shows a computer system for implementing the method shown in FIG. 3 and described in accordance with embodiments of the present invention.

FIG. 4 shows a computer system for implementing the methods shown in FIG. 3 and described in accordance with embodiments of the present invention. It should be apparent to those of ordinary skill in the art that the method 400 represents generalized illustrations and that other steps may be added or existing steps may be removed, modified or rearranged without departing from the scopes of the method 300. The descriptions of the method 300 are made with reference to the system 100 illustrated in FIG. 1 and the system 400 illustrated in FIG. 4 and thus refers to the elements cited therein. It should, however, be understood that the method 400 is not limited to the elements set forth in the system 400. Instead, it should be understood that the method 400 may be practiced by a system having a different configuration than that set forth in the system 400.

Some or all of the operations set forth in the method 300 may be contained as utilities, programs or subprograms, in any desired computer accessible medium. In addition, the method 300 may be embodied by computer programs, which may exist in a variety of forms both active and inactive. For example, they may exist as software program(s) comprised of program instructions in source code, object code, executable code or other formats. Any of the above may be embodied on a computer readable medium, which include storage devices and signals, in compressed or uncompressed form.

FIG. 4 illustrates a block diagram of a computing apparatus 400 configured to implement or execute the methods 300 depicted in FIG. 3, according to an example. In this respect, the computing apparatus 400 may be used as a platform for executing one or more of the functions described hereinabove with respect to the view angle determining component 120 and feedback component 130.

The computing apparatus 400 includes one or more processor(s) 402 that may implement or execute some or all of the steps described in the methods 300. Commands and data from the processor 402 are communicated over a communication bus 404. The computing apparatus 400 also includes a main memory 406, such as a random access memory (RAM), where the program code for the processor 402, may be executed during runtime, and a secondary memory 408. The secondary memory 408 includes, for example, one or more hard drives 410 and/or a removable storage drive 412, representing a removable flash memory card, etc., where a copy of the program code for the method 400 may be stored. The removable storage drive 412 reads from and/or writes to a removable storage unit 414 in a well-known manner.

These methods, functions and other steps may be embodied as machine readable instructions stored on one or more computer readable mediums, which may be non-transitory. Exemplary non-transitory computer readable storage devices that may be used to implement the present invention include but are not limited to conventional computer system RAM, ROM, EPROM, EEPROM, hard drives, flash memory and magnetic or optical disks or tapes. Concrete examples of the foregoing include distribution of the programs on a CD ROM or via Internet download.

Although shown stored on main memory 406, any of the memory components described 406, 408, 414 may also store an operating system 430, such as Web OS, Mac OS, MS Windows, Unix, or Linux; network applications 432; and view angle determining component 120 and a feedback component 130. The operating system 430 may be multi-participant, multiprocessing, multitasking, multithreading, real-time and the like. The operating system 430 may also perform basic tasks such as recognizing input from input devices, such as a keyboard or a keypad; sending output to the display 140 controlling peripheral devices, such as disk drives, printers, image capture device; and managing traffic on the one or more buses 404. The network applications 432 includes various components for establishing and maintaining network connections, such as software for implementing communication protocols including TCP/IP, HTTP, Ethernet, USB, and FireWire.

The computing apparatus 400 may also include an input devices 416, such as a keyboard, a keypad, functional keys, etc., a pointing device, such as a tracking ball, cursors, etc., and a display(s) 140, such as the display 140 shown for example in FIGS. 1-3. A display adaptor 422 may interface with the communication bus 404 and the display 140 and may receive display data from the processor 402 and convert the display data into display commands for the display 420.

The processor(s) 402 may communicate over a network, for instance, a cellular network, the Internet, LAN, etc., through one or more network interfaces 424 such as a Local Area Network LAN, a wireless 802.11x LAN, a 3G mobile WAN or a WiMax WAN. In addition, an interface 426 may be used to receive an image or sequence of images from imaging components 428 such as the image capture device.

The foregoing description, for purposes of explanation, used specific nomenclature to provide a thorough understanding of the invention. However, it will be apparent to one skilled in the art that the specific details are not required in order to practice the invention. The foregoing descriptions of specific embodiments of the present invention are presented for purposes of illustration and description. They are not intended to be exhaustive of or to limit the invention to the precise forms disclosed. Obviously, many modifications and variations are possible in view of the above teachings. The embodiments are shown and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents:

What is claimed is:

1. A portable device comprising:
    an image capture device for capturing an image of a local participant engaged in a video conference session;
    at least one view angle sensor for collecting sensor information about the view angle of the portable device;
    a view angle determination component for determining the view angle of the portable device using the sensor information during the videoconference session and for determining whether the view angle is within a predefined range that gives a visually satisfactory angle of the local participant participating in the videoconference session; and
    a feedback correction component provides user feedback corresponding to the captured image responsive to determining that the viewing angle is outside of the predefined range and removes the user feedback responsive to determining that the viewing angle of the portable device has been adjusted by the local participant to be within the predefined range.

2. The portable device recited in claim 1 wherein the at least one view angle sensor includes an accelerometer.

3. The portable device recited in claim 2 wherein the at least one view an view angle sensor further includes a gyroscope.

4. The portable device recited in claim 1 wherein the at least one view angle sensor includes a depth camera.

5. The portable device recited in claim 1 wherein the feedback is an image captured from the portable device of the local participant when the viewing angle is out of range.

6. The portable device recited in claim 1 wherein the image captured from the portable device of the local participant is blended with the image of the remote participant.

7. The portable device recited in claim 1 wherein the user feedback is modification of the video captured of the remote participant.

8. The portable device recited in claim 7 wherein the contrast of the captured video is modified, the contrast modification being within the range of human perception.

9. The portable device recited in claim 8 wherein the contrast modification is proportional to the amount from the ideal view angle that the portable device is out range.

10. The portable device recited in claim 7 wherein the user feedback is skewing of the video captured of the remote participant on the display screen of the local participant.

11. The portable device recited in claim 7 wherein the user feedback is the display of the local user on the display of screen of the local participant.

12. A method of providing feedback based on view angle, the method comprising:
   capturing an image of a local participant engaged in a video conferencing session using an image capture device in a portable device;
   capturing sensor data from at least one view angle sensor in the portable device during the video conferencing session;
   providing user feedback corresponding to the captured image in response to determining that the view angle of the portable device is outside a predefined range that gives a visually satisfactory angle of the local participant participating in the video conferencing session using the sensor data; and
   removing the user feedback subsequent to determining that the view angle of the portable device has been adjusted by the local participant to be within the predefined range.

13. A non-transitory computer readable storage medium having computer readable program instructions stored thereon for causing a computer system to perform a method of providing feedback based on view angle, the method comprising:
   capturing an image of a local participant engaged in a video conferencing session using an image capture device in a portable device;
   capturing sensor data from at least one view angle sensor in the portable device during the video conferencing session;
   providing user feedback corresponding to the captured image in response to determining that the view angle is outside a predefined range that gives a visually satisfactory angle of the local participant participating in the video conferencing session using the sensor data; and
   removing the user feedback subsequent to determining that the view angle of the portable device has been adjusted by the local participant to be within the predefined range.

\* \* \* \* \*